Patented Mar. 2, 1954

2,671,064

UNITED STATES PATENT OFFICE 2,671,064

METHOD OF STABILIZING HALOGEN CONTAINING RESINS WITH CADMIUM SALTS AND EPOXY ESTERS

Elmer E. Cowell, St. Louis County, and Joseph R. Darby, Richmond Heights, Mo., assignors to Monsanto Chemical Company, St. Louis, Mo., a corporation of Delaware No Drawing. Application May 10, 1950, Serial No. 161,258

13 Claims. (Cl. 260—23)

1

This invention relates to the stabilization of halogen-containing resin compositions. More particularly this invention relates to preventing the deterioration of halogen-containing resins at elevated temperatures.

As is well known to those skilled in the art, halogen-containing resins and particularly halogen-containing vinyl resins are subject to deterioration on exposure to elevated temperatures. Numerous materials have been suggested for incorporation in such resins to prevent or minimize such deterioration. However, relatively few of these stabilizing agents have proved to be particularly effective.

It is an object of this invention to provide halogen-containing resin compositions having improved resistance to deterioration on aging. A further object of this invention is to provide halogen-containing vinyl resin compositions having increased resistance to deterioration at elevated temperatures. A particular object of this invention is to provide vinyl chloride polymer compositions having increased heat stability.

According to this invention halogen-containing resin compositions having improved stability are obtained by incorporating a substance comprising an epoxy compound containing a

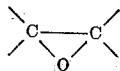

group and a cadmium salt of an organic acid in a halogen-containing resin.

The following examples are illustrative of the invention but are not to be considered as limitative thereof. Where parts are mentioned, they are parts by weight.

The compositions in the examples set forth in the table below are prepared by mixing 100 parts of polyvinyl chloride with the indicated epoxy compound and cadmium salt in the amounts set forth. The several ingredients are mixed on differential speed rolls at a roll temperature of 170° C. to form a homogeneous composition which is removed from the rolls in the form of crude sheets. From the crude sheets there are molded finished sheets which are about 0.020 inch in thickness using a molding cycle of one minute at 170° C.

The heat stability values are obtained by heating the molded sheets at 170° C. The values given in the table represent the length of time in minutes required before a moderately deep color develops and represent in each case the time required to reach substantially the same depth of color.

Table I

| Example | Ingredients per 100 parts of resin | | Heat stability at 170° C. (Min.) |
|---|---|---|---|
| | Name | Amount (Parts) | |
| I | Cyclohexyl-9,10 epoxy octadecanoate | 50 | 240 |
| | Cadmium diricinoleate | 1.5 | |
| II | Cyclohexyl-9,10-epoxy octadecanoate | 25 | 240 |
| | Tricresyl phosphate | 25 | |
| | Cadmium diricinoleate | 1.5 | |
| III | Cyclohexyl-9,10-epoxy octadecanoate | 25 | 240 |
| | Dioctyl phthalate | 25 | |
| | Cadmium diricinoleate | 1.5 | |
| IV | Cyclohexyl-9,10-epoxy octadecanoate | 25 | 180 |
| | 2-ethyl hexyl diphenyl phosphate | 25 | |
| | Cadmium diricinoleate | 1.5 | |
| V | Cyclohexyl-9,10-epoxy octadecanoate | 20 | 160 |
| | 2-ethyl hexyl diphenyl phosphate | 20 | |
| | Tetrahydrofurfuryl oleate | 10 | |
| | Cadmium diricinoleate | 1.5 | |
| VI | Cyclohexyl-9,10-epoxy octadecanoate | 25 | 140 |
| | Dioctyl phthalate | 12.5 | |
| | Tricresyl phosphate | 12.5 | |
| | Cadmium diricinoleate | 1.5 | |
| VII | Cyclohexyl-9,10-epoxy octadecanoate | 5 | 120 |
| | Dioctyl phthalate | 45 | |
| | Cadmium diricinoleate | 1.5 | |
| VIII | Cyclohexyl-9,10-epoxy octadecanoate | 25 | 100 |
| | 2-ethyl hexyl diphenyl phosphate | 25 | |
| | Cadmium diricinoleate | 1 | |
| IX | Cyclohexyl-9,10-epoxy octadecanoate | 25 | 80 |
| | 2-ethyl hexyl diphenyl phosphate | 25 | |
| | Cadmium diricinoleate | 0.5 | |

It is found that the molded sheet obtained in each of the foregoing examples is colorless and transparent prior to the heat stability tests.

Referring to the stability values in Table I, it is to be seen that the product of Example I required 240 minutes at 170° C. to develop a moderately deep color. In contrast, an otherwise identical sheet except that it contains no cadmium diricinoleate shows the same discoloration in only 100 minutes. Corresponding contrasting values for the products of other examples are: for Example II—less than 20 minutes, for Example III—less than 80 minutes, for Example IV less than 20 minutes, for Example VI—less than 40 minutes. Thus, it is to be noted that the stabilizer combination of the invention is extremely effective both in the presence and absence of various types of plasticizers and mixtures thereof. Furthermore, as shown by Examples VIII and IX, a vast improvement is effected with as little as 0.5 part cadmium diricinoleate since omission of the cadmium compound reduces the stability value to less than 20 minutes from 100 minutes and 80 minutes, respectively, and as shown by Example VII, a vast improvement is effected with as little as 5 parts of the epoxy compound.

Similarly, it is found that compositions otherwise identical to those set forth in Examples I to IX respectively in which the epoxy compound is omitted have a vastly poorer stability which is not remedied by increasing the proportion of the cadmium salt.

In further contrast to the product of Example I, if the stabilizer mixture is omitted and 50 parts of a plasticizer such as dioctyl phthalate, tricresyl phosphate or 2-ethyl hexyl diphenyl phosphate substituted therefor, the product turns dark brown in less than 20 minutes at 170° C. in each case.

Compositions having similarly improved stability may be prepared by replacing the cadmium diricinoleate in Examples I–IX with the same amount of cadmium dilaurate, cadmium dibenzoate or cadmium phthalate and/or replacing the cyclohexyl 9,10-epoxy-octadecanoate with the same amount of glycidyl phthalate, methyl-9,10-epoxy octadecanoate or a resinous glycidyl ether of bis-(4-hydroxy-phenyl) 1,1-ethane.

Further illustrative examples of the compositions of the invention are the following wherein the components in the amount specified are compounded in the same manner as in Examples I–IX. In each example the numerals represent parts by weight.

Table II

| Example | X | XI | XII | XIII | XIV |
|---|---|---|---|---|---|
| Polyvinyl chloride | 100 | 100 | 100 | 100 | 100 |
| Cresyl diphenyl phosphate | 40 | | | | 40 |
| 2-ethyl hexyl diphenyl phosphate | | 40 | 25 | 40 | |
| Glycidyl laurate | 10 | 10 | 25 | | |
| Glycidyl oleate | | | | 10 | 10 |
| Cadmium diricinoleate | 1.5 | 1.5 | 1.5 | 1.5 | 1.5 |

In the case of each of Examples X–XIV, inclusive, the compositions are found to possess remarkable stability at elevated temperatures, far exceeding that obtained by using either component of the stabilizer mixture of the invention in the absence of the other component.

It is apparent from the foregoing results that surprisingly improved stabilizing effects are obtained by using a substance comprising a cadmium salt of an organic acid and an organic compound containing a

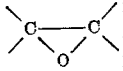

group and furthermore that the results obtained are superior to the effect produced by the use of either component alone. Among the advantages of the compositions stabilized in accordance with the invention is that halogen-containing resins may be processed into sheets and other articles without discoloration even at relatively high processing temperatures.

The results set forth above are particularly impressive when it is considered that a testing temperature of 170° C. is unusually stringent and exceeds the usual processing temperatures for polyvinyl chloride compositions. Thus, the differences between the compositions of the invention and compositions containing no stabilizer or only one component of the mixed stabilizer of the invention would be greatly magnified at lower temperatures, e. g., 160° C.

On substituting for the polyvinyl chloride used in the foregoing examples, other halogen-containing resins, it is found that surprisingly effective results are also obtained with such other resins, numerous examples of which are well known to those skilled in the art. Thus, for the polyvinyl chloride there may be substituted resins made from such vinylidene compounds as vinylidene chloride, vinyl chloracetate, chloro styrenes, chloro butadienes, etc. Such vinyl compounds may be polymerized singly or in a mixture with these or other halogen-containing vinylidene compounds or with vinylidene compounds free from halogen. Among the unsaturated materials free from halogen which may be copolymerized with halogen-containing vinylidene compounds are vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene, para-ethyl styrene, divinyl benzene, vinyl naphthalene, alpha-methyl styrene; dienes, such as butadiene, unsaturated amides, such as acrylic acid amide, acrylic acid anilide; unsaturated nitriles, such as acrylic acid nitrile; esters of $\alpha,\beta$-unsaturated carboxylic acids, for example, the methyl, ethyl, propyl, butyl, amyl, hexyl, heptyl, octyl, allyl, methallyl, and phenyl esters of maleic, crotonic, itaconic, fumaric acids and the like. The class of copolymers in which a predominant portion, i. e., more than 50% by weight, of the copolymer is made from a halogen-containing vinylidene compound such as vinyl chloride represents a preferred class of polymers to be treated according to the invention.

Among the preferred embodiments of the invention is the stabilization of polymers prepared by the copolymerization of vinyl halides, e. g. vinyl chloride with $\alpha,\beta$-unsaturated polycarboxylic acids such as diethyl maleate or other esters of maleic, fumaric, aconitic, itaconic acids, etc. Among the preferred esters of such acids are alkyl esters in which the alkyl group contains not over 8 carbon atoms.

The stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride, chlorinated natural and synthetic rubbers, rubber hydrochloride, etc.

The stabilizer mixture of the invention is also effective in halogen-containing resins containing halogens other than chlorine, e. g., bromine, fluorine and iodine.

The halogen-containing resins may contain a varying proportion of halogen depending upon the nature of the resin and its contemplated use. However, as indicated above, vinyl chloride polymers in which the proportion of vinyl chloride units amounts to 50% or more of the total monomer used in making the polymeric product represents a preferred class of polymers to be stabilized according to the invention.

When a physical mixture of a cadmium salt and an epoxy compound is used as the stabilizing substance the amounts of the components of the stabilizer combination of the invention may be substantially varied and still result in surprising improvement in stability. Usually at least 1 part of the epoxy compound is used in stabilizing 100 parts of a halogen-containing resin for most uses and generally, at least 5 parts of the epoxy compound are preferred, although smaller amounts are effective to a considerable degree. Much larger amounts may be used, e. g., 50–100 parts, and serve to lengthen the useful life of the halogen-containing resins although not in direct proportion to the amount used. However, in some cases the epoxy compound may serve both as a plasticizer and an element of the stabilizer mixture and in such cases it may be worth while to incorporate such larger amounts.

Usually the amount of the cadmium salt is smaller than that of the epoxy compound. While extremely small amounts of the cadmium salt have a noticeable effect on the stability, usually at least 0.1 part per 100 parts of halogen-containing resin is used and preferably at least 0.5 part. Generally, not over 5–10 parts of the cadmium salt are advantageously used although the use of more than 10 parts for each 100 parts of halogen-containing resin is not precluded. A preferred range is 0.5–5 parts of cadmium salt for each 100 parts of resin.

The epoxy compounds used in the stabilizer mixture of the invention comprise organic compounds generally containing one or more

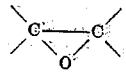

groups. Various substituted and unsubstituted aliphatic, aromatic, alicyclic and heterocyclic groups may be attached to said epoxy groups. Generally, however, the epoxy compounds which are employed should have a boiling point at atmospheric pressure of at least 150° C.; otherwise the stabilizing effect is likely to be relatively transitory due to evaporation of the epoxy compound and preferably the epoxy compounds should have a boiling point of at least 200° C. at atmospheric pressure. Illustrative examples of epoxy compounds which may be used according to the invention are 1,2-epoxytetradecane, 1,2-epoxyoctadecane and other derivatives of long chain alkanes, for example, alkanes having 10–24 carbon atoms having a

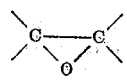

group; epoxy esters containing a long carbon chain such as glycidyl laurate, methyl 9,10-epoxyoctadecanoate, diethylene glycol, di-9,10-epoxyoctadecanoate, 9,10-epoxy octadecanyl acetate, 9,10-epoxyoctadecanyl octadecanoate, esters of polycarboxylic acids and alcohols containing a

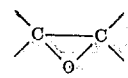

group such as di-2-ethyl hexyl epoxy succinate, butyl glycidyl phthalate, diglycidyl phthalate, propylene glycol diglycidyl phthalate, diethylene glycol diglycidyl maleate, 2-ethyl hexyl glycidyl adipate, hexyl glycidyl sebacate and other esters of these and other polycarboxylic acids containing at least a

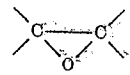

group and epoxidized acids and esters generally containing an unsaturated long chain aliphatic group such as epoxidized animal, vegetable or marine oils or the fatty acids or mixtures of fatty acids contained in such oils and esters thereof, e. g., epoxidized linseed oil, epoxidized soybean oil, epoxidized oleic acid, epoxidized tung oil, the methyl ester of epoxidized linseed oil fatty acids, etc.; glycidols such as glycidol, beta-methyl glycidol, beta-ethyl glycidol, beta-hydroxy methyl glycidol, di-isobutenyl dioxide; epoxidized ethers such as alkyl glycidol ethers in which the alkyl group contains 1–5 carbon atoms, e. g., methyl, ethyl, propyl, butyl, amyl glycidyl ethers; glycidyl ethers containing unsaturated groups such as vinyl, allyl and methylallyl glycidyl ethers; phenyl glycidyl ether, tolyl glycidyl ethers, naphthyl glycidyl ethers, cyclopentyl glycidyl ether, cyclohexyl glycidyl ether, etc. Other illustrative epoxy compounds include cyclohexane oxide, 1-(2-phenylphenoxy) propylene oxide-2,3, 1-(2-phenyl-cyclohexanoxy) propylene oxide-2,3, 1-(cyclohexanoxy) propylene oxide-2,3, 1-(2-cyclohexyl-phenoxy) propylene oxide-2,3, 1-(4-tertiary butyl phenoxy) propylene oxide-2,3, styrene oxides such as styrene oxide, para-ethyl styrene oxide, dimethyl styrene oxide, ortho-methoxy styrene oxide, 4-(2,3-epoxypropoxy) acetyl phenone, the corresponding benzophenone epoxide, 4,4'-di(2,3-epoxy-propoxy) benzophenone, mesityl oxide epoxide; epoxy alkyl and epoxy cycloalkyl amides such as 2-ethyl-3-propyl glycidamide, 2,3-di-propylglycidamide; aryloxyalkene oxides such as phenoxy propene oxide, para-tertiary amyl and para-secondary amyl phenoxy propene oxides.

According to one embodiment of the invention the epoxy compounds are epoxy ethers such as the glycidyl ethers of such polyhydric alcohols as glycerin, diglycerol, erythritol, pentaglycerol, pentaerythritol, mannitol, sorbitol, polyallyl alcohol, polyvinyl alcohol, ethylene glycol, propylene glycol, butylene glycol, etc.

One of the preferred classes of epoxy compounds comprises high molecular weight or resinous epoxy compounds, for example, those made by reacting polyhydric phenols with epichlorhydrin in various ratios in alkaline solution. Among the polyhydric phenols which may be used in preparing such glycidyl ethers are mononuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methylphenyl)-2,2-propane, bis-(4-hydroxy-2-tertiary butyl phenyl)-2,2-propane, bis-(2-dihydroxynaphthyl)-methane, 1,5-dihydroxy naphthalene, phloroglucinol, 1,4-dihydroxy naphthalene, 9,10-dihydroxy anthracene, 1,3,6-trihydroxy naphthalene, 4,4-dihydroxy diphenyl, 2,2-bis(4-hydroxy phenyl) propane and 1,4-bis(4-hydroxy phenyl) cyclohexane, etc. Such phenols may be reacted with epoxy chlorhydrin in the presence of an inorganic alkaline material to form the epoxy compounds, which, depending upon the conditions of the reaction, may be either monomeric or polymeric materials. Examples of such epoxy compounds include 1,4-diglycidol epoxy benzenes and 2,2-bis(4-glycidol oxyphenyl) propanes.

Other compounds containing a

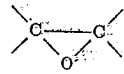

group which may be used in accordance with the invention include those made by reacting alkyl sulfonyl chlorides with glycidol in the presence of ammonia wherein the alkyl group contains up to 20 or more carbon atoms, e. g.,

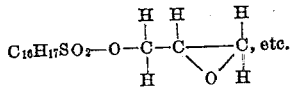

Various cadmium salts of organic acids may be used in place of cadmium diricinoleate with similar results. Examples of such salts include those made from such acids as saturated aliphatic acids, e. g., ethanoic, propanoic, butanoic, pentanoic, hexanoic, heptanoic, octanoic, nonanoic, decanoic, hendecanoic, dodecanoic, tetradecanoic, hexadecanoic and octadecanoic; mono-olefinic-unsaturated aliphatic acids such as propenoic acid, 2-butenoic acid, 2-methyl-2-propenoic acid, 3-butenoic acid, 2-pentenoic acid, 4-pentenoic acid, 2-methyl-2-butenoic acid, 2-hexenoic acid, 7-hexadecenoic acid, 10-undecenoic acid, 13-docosenoic acid, 3-hexenoic acid, and 9-octadecenoic acid; diolefinic-unsaturated aliphatic acids such as 2,4-pentadienoic acid, 2,4-hexadienoic acid, 3,7-dimethyl-2,6-octadienoic acid, 9,12-octadecadienoic acid; triolefinic-unsaturated aliphatic acids such as 3,7-dimethyl-2,4,6-octatrienoic acid, 9,12,15-octadecatrienoic acid, 9,11,13-octadecatrienoic acid; substituted olefinic acids, for example, such hydroxy olefinic acids as 2-hydroxy-3-butenoic acid, 16-hydroxy-7-hexadecenoic acid and 12-hydroxy-9-octadecenoic acid; acetylenic unsaturated aliphatic acids such as propynoic, butynoic, pentynoic, amyl propynoic, 7-hexadecynoic, 9-octadecynoic and 13-docosynoic acids.

Mixtures of unsaturated aliphatic acids may be employed, as for example, mixtures of acids occurring in various oils, as for example, linseed, castor, tung, soya bean, perilla, corn, cotton seed, sunflower, safflower, sesame, poppy seed, walnut, peanut, olive, rape seed, whale and dehydrated castor oils. The acids derived from these oils consist predominantly of unsaturated acids containing 18 carbon atoms. For certain purposes, salts may be used which are made of the mixtures of acids occurring in oils such as palm kernel oil, cocoanut oil and the like, which mixtures of acids contain substantial amounts of unsaturated acids such as those mentioned above, but do not predominate therein.

Other cadmium salts of organic acids may also be used such as cadmium salts of aliphatic polycarboxylic acids, e. g., cadmium salts of maleic, succinic, adipic and sebacic acids, etc., as well as polycarboxylic acids obtained by polymerization of unsaturated fatty acids, e. g., oleic acid dimer and linoleic acid dimer; salts of aromatic acids, e. g., cadmium salts of phenyl-acetic, benzoic, phthalic and salicylic acids; salts of cyclic acids, e. g., the cadmium salt of abietic acid.

The cadmium salts may be either neutral or basic salts when monocarboxylic acids are used. Mixed salts made from mixtures of acids may also be used.

Of the various salts which may be used in the stabilizer combination of the invention, a preferred class comprises those made from ethylenically unsaturated fatty acids containing at least 10 carbon atoms, e. g., 10-24 carbon atoms, such as those mentioned above.

According to a further embodiment of the invention, the stabilizer may comprise a single compound containing cadmium and a

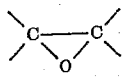

group, e. g., cadmium di-9,10-epoxy octadecanate and other cadmium salts of organic acids containing a

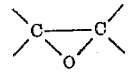

group such as those epoxy acids mentioned above.

The stabilizer of the invention is of particular importance in stabilizing halogen-containing resins especially vinyl chloride polymers plasticized with alkyl diaryl phosphates in which the alkyl group contains 6–14 carbon atoms and the aryl groups are phenyl or cresyl groups, i. e., ortho-, meta-, or para-cresyl groups since compositions containing such plasticizers have proved to be especially difficult to stabilize. Examples of such esters include 2-ethylhexyl diphenyl phosphate, 2-ethylhexyl dicresyl phosphate, 2-ethylhexyl phenyl cresyl phosphate, hexyl diphenyl phosphate, hexyl phenyl cresyl phosphate, hexyl dicresyl phosphate, dodecyl diphenyl phosphate, dodecylphenyl cresyl phosphate, dodecyl dicresyl phosphate, etc. Mixtures of such esters may frequently be used advantageously. The amount of the phosphate ester which is used may be substantially varied depending upon the particular ester and upon the particular use which is contemplated for the plasticized composition. Usually however from 10 to 100 parts of the ester are used for every 100 parts of vinyl chloride-containing resin.

When desired, mixtures of the phosphate esters of the invention and other plasticizers may be used as, for example, such conventional plasticizers as di-octyl phthalate, tri-cresyl phosphate, etc.

The foregoing description is given in illustration and not in limitation of the invention as set forth in the appended claims.

We claim:

1. A composition resistant to the discoloring effects of heat comprising a chlorine containing resin and as a stabilizer therefor a substance comprising a cadmium salt of an organic acid and an organic ester selected from the class consisting of esters of aromatic and aliphatic acid, wherein said ester contains a

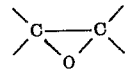

group.

2. A composition as defined in claim 1 in which the stabilizer is a mixture of a cadmium salt of an organic acid and a long chain ester of an aliphatic acid, wherein said ester contains a

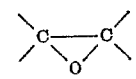

group.

3. A composition resistant to the discoloring effects of heat comprising a chlorine-containing vinylidene resin and as a stabilizer therefor a mixture of a cadmium salt of an organic acid and an organic ester selected from the class consisting of esters of aromatic and aliphatic acids, wherein said ester contains a

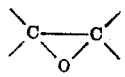

group.

4. A composition as defined in claim 3 in which the organic acid is an ethylenically unsaturated fatty acid containing at least 10 carbon atoms.

5. A composition as defined in claim 3 in which the resin is a vinyl chloride polymer.

6. A composition as defined in claim 3 in which the resin is polyvinyl chloride.

7. A composition as defined in claim 3 in which the resin is a vinyl chloride-vinyl acetate copolymer.

8. A composition as defined in claim 3 in which the resin is a vinyl chloride-diethyl maleate copolymer.

9. A heat resistant composition comprising a vinyl chloride polymer and as a stabilizer therefor a mixture of cadmium diricinoleate and an organic ester selected from the class consisting of esters of aromatic and aliphatic acids, wherein said ester contains a

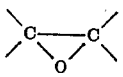

group and a boiling point of at least 150° C.

10. A heat resistant composition comprising a vinyl chloride polymer and as a stabilizer therefor a mixture of 0.1-5 parts cadmium diricinoleate and at least 5 parts of a long chain aliphatic ester containing a single

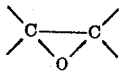

group and boiling above 200° C. for each 100 parts of polymer.

11. A composition as defined in claim 10 in which the polymer is polyvinyl chloride.

12. A composition as defined in claim 10 in which the polymer is a vinyl chloride-vinyl acetate copolymer.

13. A composition as defined in claim 10 in which the polymer is a vinyl chloride-diethyl maleate copolymer.

ELMER E. COWELL.
JOSEPH R. DARBY.

References Cited in the file of this patent

UNITED STATES PATENTS

| Number | Name | Date |
|---|---|---|
| 2,456,216 | Richter | Dec. 14, 1948 |
| 2,462,422 | Plambeck | Feb. 22, 1949 |
| 2,590,059 | Winkler | Mar. 18, 1952 |